Nov. 10, 1953   J. FERDA ET AL   2,658,765
WORK OBJECT AND SUPPORT SECURING DEVICE
Filed Aug. 11, 1950

SECTION C-D

SECTION A-B

INVENTOR.
Julius Ferda
Siegfried Deutsch
BY Desjardins, Robinson & Keiser
Albert F. Robinson
attorneys Patented Nov. 10, 1953

2,658,765

UNITED STATES PATENT OFFICE 2,658,765

WORK OBJECT AND SUPPORT SECURING DEVICE

Julius Ferda and Siegfried Deutsch, Cincinnati, Ohio

Application August 11, 1950, Serial No. 178,966

6 Claims. (Cl. 279—3)

This invention relates to a work object and support securing device, and it particularly pertains to a small compact device, simple in construction, having oppositely disposed flexible discs presenting opposite faces to be abutted against two flat surfaces between which the device is interposed for readily attaching and detaching them to the faces of the unit by making and breaking a vacuum between the abutting parts.

Securing units heretofore used are positively secured to the work object or to the support, and more often are positively secured to both. They require a support especially constructed for use with the type of securing unit, and one which requires the securing unit to be fixed to a particular part of the support. The most common type of securing unit is that which is clamped to an edge of a table support. Such holding units are usually cumbersome and awkward to handle and pack so that they cannot be handled or moved with facility. Furthermore, they are not of a construction to be secured to a flat surface of the support but to an edge thereof, and they, therefore are not adapted to be attached to any part of the flat surface of the support.

Accordingly the principal object of the present invention is to provide a securing device which is simple in construction and is used with facility with a suitable support.

Another object of the invention is to provide a securing device which is compact and can be readily attached to any flat surface.

Another object of the invention is to provide a securing device which does not require positive or permanent attachment to the support.

Another object of the invention is to provide a securing device which is of a construction to be readily attached to and detached from a support and a work object by merely being interposed therebetween.

Another object of the invention is to provide a securing device which has oppositely disposed flexible surfaces with any suitable means interposed therebetween to flex those surfaces for making and breaking a vacuum between the abutting parts.

Further objects, and objects relating to details of construction and economies of operation, will readily appear from the detailed description to follow. In one instance we have accomplished the objects of our invention by the devices and means set forth in the following specification. Our invention is clearly defined and pointed out in the appended claims. Structures constituting embodiments of our invention are illustrated in the accompanying drawings forming a part of this specification, in which:

Figure 1:
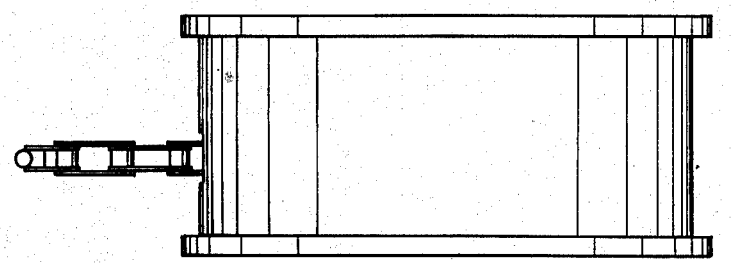
Fig. 1 is a perspective view of a holding unit embodying our invention.
Figure 2:
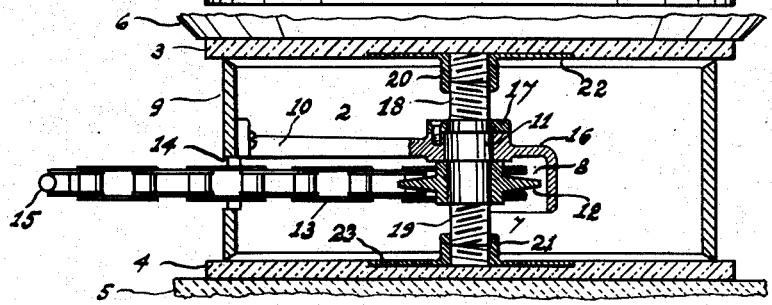
Fig. 2 is a vertical cross sectional view of the device and of a support and work object between which it is interposed.

The invention comprises a hollow frame or casing having open opposite ends or sides which are closed by a flexible disc plate for each opposite side or end to present opposite attaching faces. The disc plates are attached to the frame member in any suitable way so that portions thereof can be flexed to make and break a vacuum between flat surfaces against which the exposed faces of the discs are abutted. Suitable means are mounted within the frame or casing for being operated to flex the disc plates. The securing unit is flat with the opposite disc plates duplicates so that the unit can be utilized by simply being interposed between the flat surface of a support and the flat surface of a work object. The means for flexing the disc plates is operated for making or breaking a vacuum between the disc plates and the abutting surfaces. Accordingly, the unit can be moved over the flat surface of any support to any location for receiving a work object, and it can be easily removed from the support when not in use. The unit is secured to the support entirely by vacuum, and the work object is secured wholly by vacuum to the unit without requiring any positive connection.

Since the holding means supports the work object thereon and is itself supported on another support, such as a table, it may be referred to as the supplemental support and the other support or table designated as the main support.

Referring specifically to the drawings in which like numerals are used to designate like parts, numeral 2 is a securing or holding unit having opposite top and bottom flexible discs 3 and 4 with exposed surfaces, one of which is adapted to be vacuum attached to a support 5 and the other of which is adapted to have a work object 6 vacuum attached thereto. The vacuum between the discs and the abutting members is made and broken by a means 7 mounted within the holding unit to be connected to the discs and having manual operating means 8 hereinafter described for flexing portions of the discs.

The holding unit comprises a hollow frame or casing 9, preferably cylindrical, having an arm 10 attached to its inside wall and projecting centrally thereof for concentrically mounting a revolvable shaft or sleeve 11. A sprocket 12 is pinned to the shaft or sleeve 11 to receive the intermediate portion of a sprocket chain 13 whose opposite ends project through recess or recesses 14 in the wall of the frame or casing, and to which handles 15 can be attached. The arm 10 has a guard 16 surrounding the sprocket to hold the sprocket chain 13 in mesh with the sprocket 12. The sleeve or shaft carries a thrust washer 17 on the side of the arm opposite to the sprocket pulley for holding the sleeve or shaft against axial movement. The opposite ends 18 and 19 of the sleeve or shaft are oppositely threaded for being screw-threadedly connected to sockets 20 and 21 which are carried by the respective discs 3 and 4. The discs are molded from suitable flexible, air-sealed material, such as rubber, and the sockets 20 and 21 can be projecting parts of plates 22 and 23 which are molded within or attached to the discs with the sockets exposed and inwardly directed for being screw-threadedly connected with the screw-threaded opposite ends 18 and 19 of the shaft or sleeve.

The central or socket carrying portions of the flexible discs are moved toward or away from each other by turning the shaft or sleeve clockwise or counter-clockwise, the rim portions of the discs remaining seated against the side edges of the frame or casing. Accordingly, a vacuum is set up or broken by pulling one end of the sprocket chain to turn the sleeve or shaft. The holding device is simply laid upon the support with one side seated thereupon. The work object is then placed upon the exposed top side of the holding unit. In this position, the sprocket chain can be pulled to turn the shaft clockwise to secure the holding unit by vacuum to the surface of the support, and at the same time the work object is also secured by vacuum to the holding unit. A single pull of the sprocket chain in one direction either secures the abutting members together by vacuum or releases them. After the work object has been worked upon, a pull on the sprocket chain in the opposite direction to turn the shaft or sleeve counter-clockwise will move the central portions of the discs away from each other and break the vacuum between the securing unit and the abutting objects to release them. The holding unit can be used upon any portion of the support surface, and when not in use can be readily moved aside, or entirely removed from the support.

Figure 3:
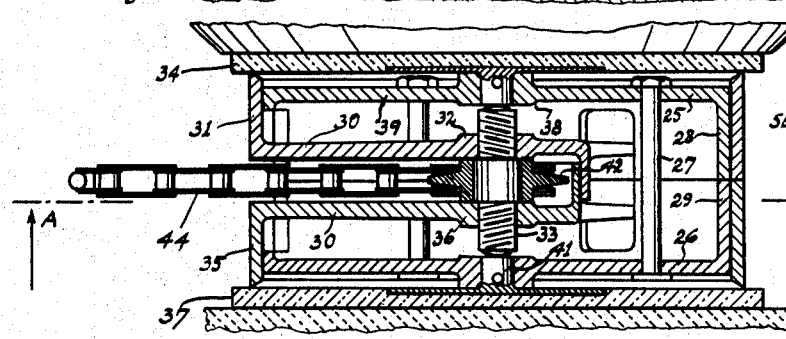
Fig. 3 is a vertical cross sectional view like Fig. 2 of an embodiment of the device.
Figure 4:
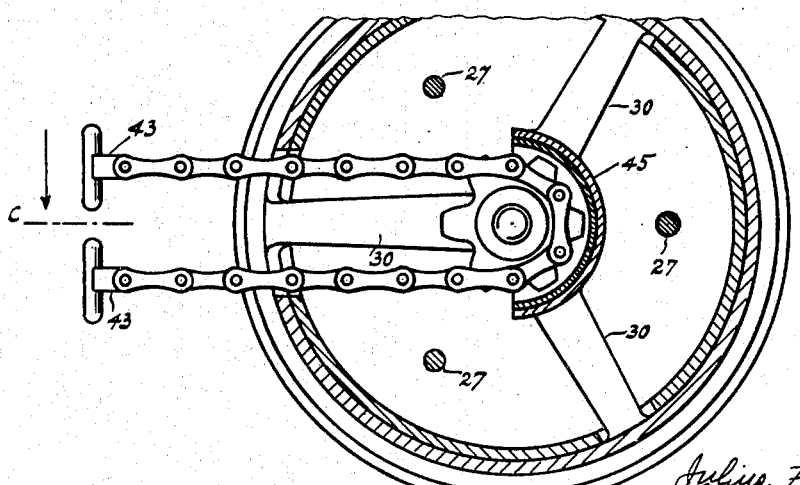
Fig. 4 is a top sectional view of the embodiment in Fig. 3.

In the modification of Fig. 3, the rim portions of the discs are flexed by the operating mechanism for creating and breaking a vacuum between the holding unit and abutting parts. The rim portions of the discs are flexed by operating mechanism for creating and breaking the vacuum between the holding unit and the abutting parts. In principle this modification is like that above described.

A frame member or casing comprising two duplicate caps 25 and 26 are bolted together with bolts 27 with the edges of sidewalls 28 and 29 of the caps in contact. These sidewalls 28 and 29 of the caps are recessed at spaced intervals to accommodate the arms 30 of a ring 31 which project from a central hub portion 32 that is screw-threaded to one end of a shaft 33. This ring 31 contacts with a flexible disc 34 for moving the outer margin thereof when the ring 31 is reciprocated by the shaft 33. There is a duplicate ring 35 similarly connected at its central hub portion 36 with the opposite end of the shaft 33 for contact with the outer margin of the other flexible disc 37. The screw thread on one end of the shaft 33 is oppositely disposed to that on the other end of the shaft so that by turning the shaft, the rings 31 and 35 will either be drawn toward or away from each other. The disc 34 has a projection 38 extending from its bottom center portion for being fastened to the hub portion 39 of the cap 25. The other disc 37 is likewise fastened to the hub portion 40 of the other cap member 26 by a projection 41 extending from the center of the top side of the disc.

A sprocket 42 is pinned to the shaft 33 for receiving an intermediary portion of a chain 43 which is fitted to the sprocket with its free ends 44 projecting through the sidewalls of the caps 28 and 29 in position to be accessible for turning the shaft 33. A guard 45 is provided on one of the ring arms to hold the chain 43 in mesh with the sprocket 42. In this embodiment, the disc members are secured with the central portions fixed in position and the outer portions flexed inwardly and outwardly by the shaft being turned. By pulling the sprocket chain in one direction, the rings 31 and 35 are actuated toward each other to draw them inwardly relative to the central portions of the disc members, whereas when the sprocket chain is pulled in the opposite direction, it will move the rings outwardly and away from each other to force the surrounding lip portions of the discs outwardly in respect to their central portions. When the disc portions are moved outwardly a vacuum is formed, and when they are moved inwardly the vacuum is broken.

The holding device is a compact unit adapted to be placed on the support with one of the discs in contact therewith. The work object is placed on top of the other disc, and with a single pull of the sprocket chain, the abutting objects are secured to or released from the holding unit.

While we have illustrated and described a shaft with means connecting it to the discs for reciprocating them, it will be understood that the invention is not limited to this or any particular operating means, but that any operating means may be used for the purpose. The crux of the invention is in the oppositely disposed flexible discs with any operating means for flexing them to make and break a vacuum between them and the abutting surfaces with which they are contacted.

We are aware that there may be various changes in details of construction without departing from the spirit of our invention, and, therefore, we claim our invention broadly as indicated by the appended claims.

Having thus described our invention, what we claim as new and useful and desire to secure by United States Letters Patent, is:

1. As an article of manufacture, a supplemental support for holding a work object to a main support comprising a body member having oppositely disposed discs, each having a flat face adapted to seat against an abutting surface, and common means operatively connected with the discs to move a portion of each of them in respect to another portion towards and away from each other for making and breaking a vacuum between the disc faces and the abutting surfaces.

2. As an article of manufacture, a supplemental support as set forth in claim 1 in which the discs are flexible and are flexed by the operating means for making and breaking the vacuum.

3. As an article of manufacture, a supplemental support for holding a work object to a support comprising a hollow frame with open top and bottom sides, a flexible disc fitted to each of the top and bottom sides of the frame to provide a vacuum surface, a member mounted on the frame and operatively connected with a portion of each of the discs for flexing them, and means for actuating said member.

4. As an article of manufacture, a device for holding a work object to a main support comprising a hollow frame having top and bottom sides, a flexible disc mounted on each of the top and bottom sides of the frame, a member having means on its opposite ends for being operatively connected to a portion of each of the discs for flexing that portion of each disc relative to another portion thereof, and means for operating the member.

5. A supplemental support for holding a work object to a main support comprising a hollow frame having open top and bottom sides, a flexible disc mounted on each of the top and bottom sides of the frame, movable means mounted in the frame for flexing portions of the discs in respect to other portions, and means projecting from the frame for actuating the movable means.

6. A supplemental support for holding a work object to a main support comprising a hollow body member having oppositely disposed vacuum forming seating surfaces, and means mounted on the body member and connected with said seating surfaces to actuate them for making and breaking a vacuum between said oppositely disposed surfaces and objects seated thereagainst.

JULIUS FERDA.
SIEGFRIED DEUTSCH.

References Cited in the file of this patent

UNITED STATES PATENTS

| Number | Name | Date |
|---|---|---|
| 1,147,102 | Knabe | July 20, 1915 |
| 1,226,702 | Schlenter | May 22, 1917 |
| 1,275,447 | Hodney et al. | Aug. 13, 1918 |
| 1,801,723 | Clifford, Jr. | Apr. 21, 1931 |
| 1,840,400 | Lebherz | Jan. 12, 1932 |
| 2,203,572 | Johnson | June 4, 1940 |
| 2,348,085 | Merolle | May 2, 1944 |
| 2,512,274 | Hawk | June 20, 1950 |
| 2,565,793 | Weismantel | Aug. 28, 1951 |